(No Model.)
W. MANLEY.
ROTARY CUTTER.
No. 374,417. Patented Dec. 6, 1887.
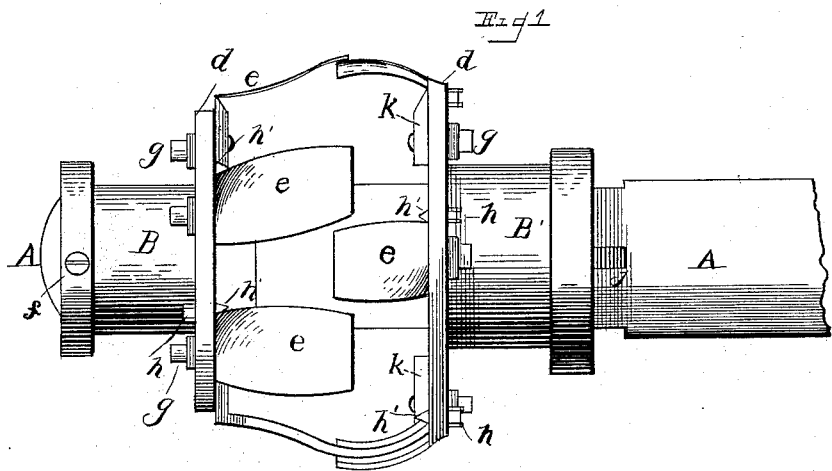
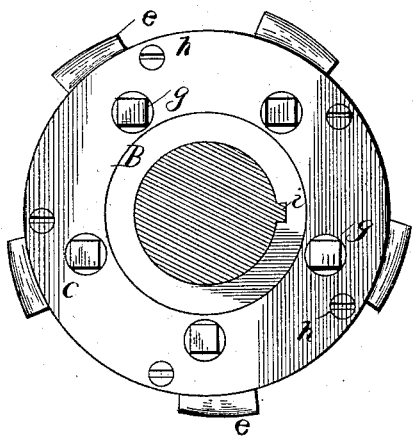
Witnesses
Fred L. Emery.
Howard F. Eaton.
Inventor
William Manley
By his Attorney Crosby & Gregory

UNITED STATES PATENT OFFICE.

WILLIAM MANLEY, OF ROCHESTER, NEW YORK, ASSIGNOR TO JAMES W. BROOKS, TRUSTEE, OF CAMBRIDGE, MASSACHUSETTS.

ROTARY CUTTER.

SPECIFICATION forming part of Letters Patent No. 374,417, dated December 6, 1887.

Application filed July 24, 1886. Serial No. 208,992. (No model.)

*To all whom it may concern:*

Be it known that I, WILLIAM MANLEY, of Rochester, in the county of Monroe and State of New York, have invented certain new and useful Improvements in Rotary Cutters for Trimming Boot and Shoe Heels; and I do hereby declare that the following is a full and exact description thereof, reference being had to the accompanying drawings, making part of this specification.

This invention has for its object to construct a rotary cutter especially adapted for trimming the heels of boots and shoes; and it consists, essentially, of a series of knives pivoted eccentric to the axis of the spindle carrying them, and arranged concentric with relation to the spindle, combined with independent adjusting devices for turning the knives on their pivots, to so regulate the distance of the cutting-edges of the knives from the spindle that all the knives will cut or trim the heel substantially the same depth.

The knives are herein shown as formed of blades and strong shanks bent at substantially right angles with relation to each other, the shanks of the knives abutting against the face of and pivoted to a flange attached to or forming a part of a hub, which latter is secured to a rotating spindle.

The adjusting devices are herein shown as composed of a conical or tapering pointed screw passing through the flange, one side of the conical point bearing against one side of the shank, so that as the screw is advanced the cutter is turned on its pivot eccentric to the axis of the spindle, to thereby turn the cutting-edge thereof a greater or less distance from the spindle to regulate the depth of the cutter.

I have herein shown two like cutter-heads attached to a single spindle and facing each other, the blades of the heads preferably intermeshing for a short distance.

Figure 1 shows in side elevation two like cutter-heads embodying this invention attached to a single rotating spindle, and Fig. 2 an end view of one of the cutter-heads.

The main rotating spindle A is of any usual or suitable diameter and length, preferably projecting from and rotated by the heel-trimming machine of ordinary construction. The hub or collar B is secured or splined upon the spindle A, said hub having an outwardly-extended flange, $d$. A series of cutters are arranged upon the flange $d$ concentric with relation to the spindle A.

Each of the cutters consist of a curved blade, $e$, and shank $k$, bent substantially at right angles with relation to each other. The shanks $k$ of the cutters lie against the outer face of a flange, $d$, and are pivoted thereto by screws or studs $g$, so that each knife can turn eccentric to the axis of the spindle A to vary the distance of the cutting-edge of the knife from the spindle, turning it outward or inward from said spindle.

Independent adjusting devices are provided, co-operating with each cutter to positively turn it on its pivot, and also to serve as a shoulder or abutment against which the shank of the cutter may bear to better enable it to withstand the strain upon it. These adjusting devices consist of the screw $h$, having conical or tapering points $h'$ fastened to the flange $d$, one side of the conical points bearing against one side of the shank $k$ of the knives, so that as the said screws $h$ are turned the knife is caused to turn on its pivot, the pivotal screw being preferably loosened at such time. By this arrangement it will be seen that a series of knives are easily arranged concentric with relation to the spindle carrying them, and also each knife pivoted eccentric with relation to the axis of the rotating spindle, and by the adjusting screws or devices each knife is turned on its pivot to vary the distance the cutting-edge of the knife shall be from the spindle.

By providing independent adjusting-screws for each knife it may be properly adjusted to correspond with the remaining knives of the series, irrespective of the width or length of the blade.

It is obvious that many devices can be applied to the cutter for positively adjusting the knives on an axis eccentric to the axis of the spindle carrying them, thereby accomplishing the essential features of this invention, so I do not desire to limit my invention to the exact construction shown.

I have herein shown short blades $e$, for trimming low heels; and to trim high heels or other articles desired it will sometimes be preferable to employ a pair of cutter-heads, each constructed as above described and secured to the same spindle or rotating shaft and facing each other, in order that the blades may, if desired, intermesh for a short distance.

In another application filed by me, Serial No. 203,330, I have shown a series of knives pivoted eccentric to the axis of the spindle, and also devices for adjusting one of the said knives with relation to the other or toward and from the other radially from the axis of the spindle, and such construction I do not herein claim.

I claim—

1. In a rotary cutter for trimming boot and shoe heels, a series of knives and a spindle, and means, carried by the spindle, whereon the knives are eccentrically pivoted, combined with an independent adjustable inclined shoulder or bearing for each knife, against which the said knives bear, movement of the inclined adjustable bearing or shoulder varying the distance of the cutting-edges of the blade of the knife from the spindle, substantially as described.

2. In a rotary cutter for trimming boot and shoe heels, a series of knives and a spindle, and means, carried by the spindle, whereon the knives are pivoted eccentrically with relation to the axis of said spindle, combined with the conical or tapering pointed screw for adjusting the knives on their pivots, substantially as described.

3. In a rotary cutter for trimming boot and shoe heels, the spindle and hub having a flange secured to it and carried by the spindle, combined with a series of cutters, each having a shank, $k$, and a curved blade, $e$, bent substantially at right angles with relation to each other and pivoted to the flange of the hub eccentric with relation to the axis of the spindle, so that the curved blades may remain concentric with said spindle, and adjusting devices for moving said knives on their pivots to turn the cutting-edges thereof toward or from the spindle, substantially as described.

WILLIAM MANLEY.

Witnesses:
POMEROY P. DICKINSON,
MORTIMER F. BABCOCK.